United States Patent [19]

Nottingham et al.

[11] Patent Number: 5,433,804
[45] Date of Patent: Jul. 18, 1995

[54] HOT MELT ADHESIVE HEATING BY MEANS OF MICROWAVE

[75] Inventors: John R. Nottingham; John Spirk, both of Moreland Hills; Craig M. Saunders, Rocky River; Paul E. Brokaw, Euclid, all of Ohio

[73] Assignee: Nottingham Spirk Design Associates, Cleveland, Ohio

[21] Appl. No.: 237,246

[22] Filed: May 4, 1994

Related U.S. Application Data

[63] Continuation of Ser. No. 562,520, Aug. 6, 1990, abandoned.

[51] Int. Cl.⁶ .................................. B32B 31/00
[52] U.S. Cl. ........................ 156/71; 156/272.2; 156/273.3; 156/320; 156/324.4; 428/345; 428/349; 428/354; 428/344; 219/678; 206/348; 206/813; 211/32; 211/35; 211/87; 248/205.3
[58] Field of Search ............. 156/272.2, 272.4, 71, 156/273.3, 66, 320, 324.4; 428/345, 346, 347, 349, 354, 138, 139, 344; 219/10.41, 10.53, 10.55 M, 10.55 R, 10.57, 678; 206/813, 348; 211/32, 35, 87; 248/636, 467, 205.3

[56] References Cited

U.S. PATENT DOCUMENTS

| | | | |
|---|---|---|---|
| 4,871,892 | 10/1989 | Samford | 219/10.55 E |
| 4,906,497 | 3/1990 | Hellmann et al. | 156/78 X |
| 4,911,938 | 3/1990 | Fisher | 426/107 |
| 5,188,256 | 2/1993 | Nottingham | 222/1 |
| 5,254,197 | 10/1993 | Klems | 156/275.7 |
| 5,294,763 | 3/1994 | Chamberlain | 219/729 |

OTHER PUBLICATIONS

U.S. patent application 07/355,044 filed Apr. 7, 1989 (parent application of Ser. No. 07/588,591, now U.S. Pat. No. 5,294,763).
Capotosto, R., "No Holes Hanger," Popular Mechanics, Aug., 1989, p. 89.
Roman, M., "The Little Waves That Could," Discover, Nov., 1989, pp. 54–60.
H. B. Fuller, Company, Wilmington, Mass., 1988 (Industrial Assembly Systems sales brochure).
Lee Wang America Corp., "Easy–Hanger" (advertisement).
Capotosto, R., "Using Hot Melt Glue," Popular Mechanics.
"Twenty Ways to Use Your Microwave".
Rooze, "Hot Melt Glue Gunning," The Family Handyman, Oct. 1986, pp. 14, 16.

Primary Examiner—Chester T. Barry
Attorney, Agent, or Firm—Calfee Halter & Griswold

[57] ABSTRACT

A structure and a technique for heating hot melt adhesive by means of microwaves, to place the hot melt adhesive in a tacky state in which it adheres to an object. A preferred structure according to the invention comprises an article of manufacture (e.g., a wall hook) having a mass of the hot melt adhesive and a susceptor thereon. The article, with the adhesive and susceptor thereon, can be subjected to microwaves for a predetermined period of time, to place the mass of adhesive in a tacky state which enables the article to be attached to an object (e.g., a wall). A special container for the article is placed with the article into a microwave oven as a unit, and removed as a unit from the oven. The container enables the article to be safely and efficiently attached to the object.

40 Claims, 6 Drawing Sheets

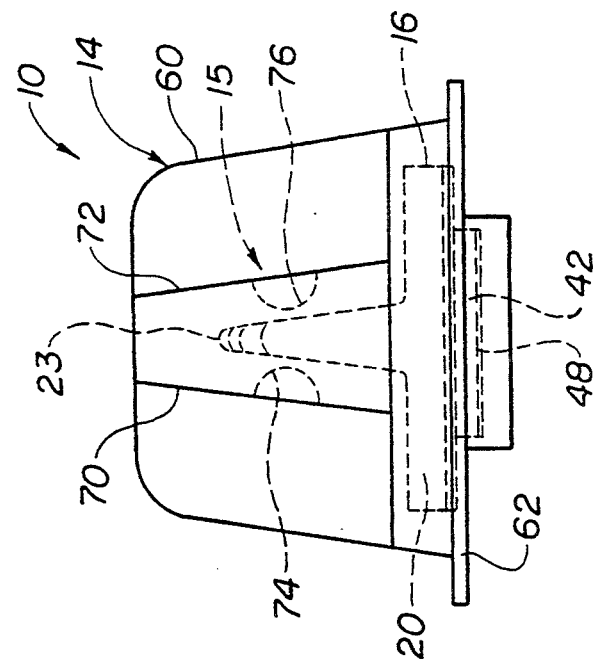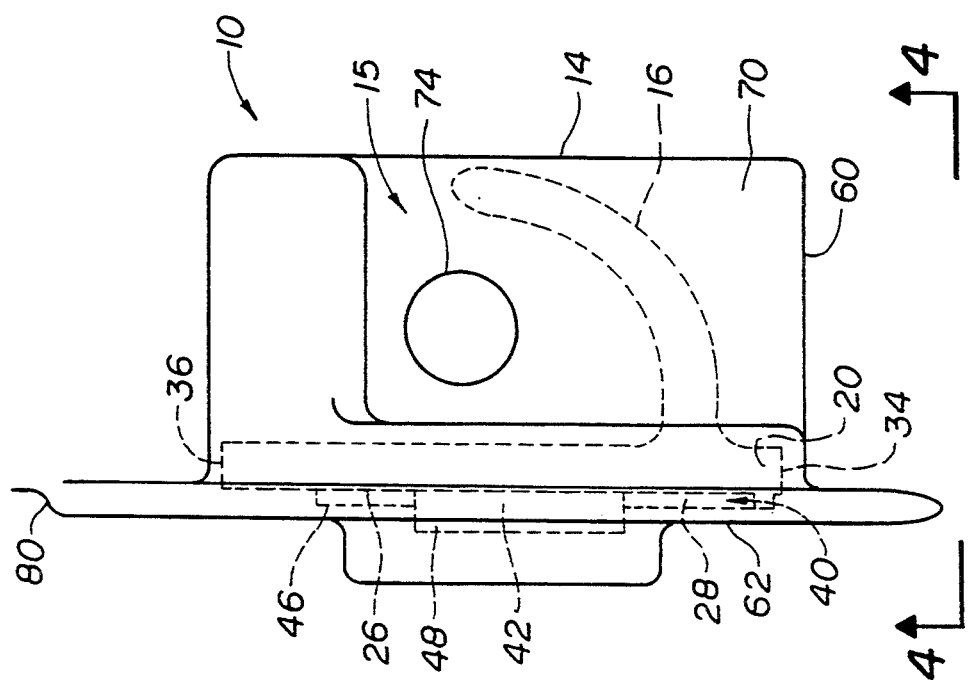

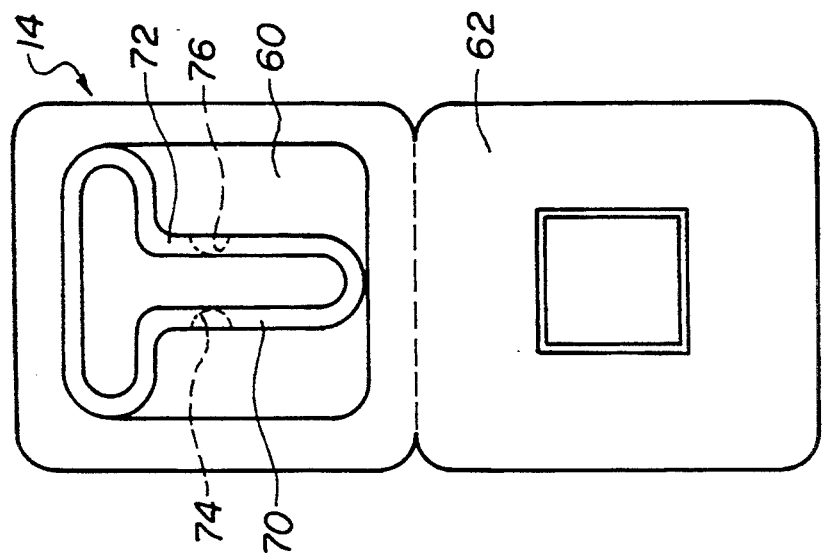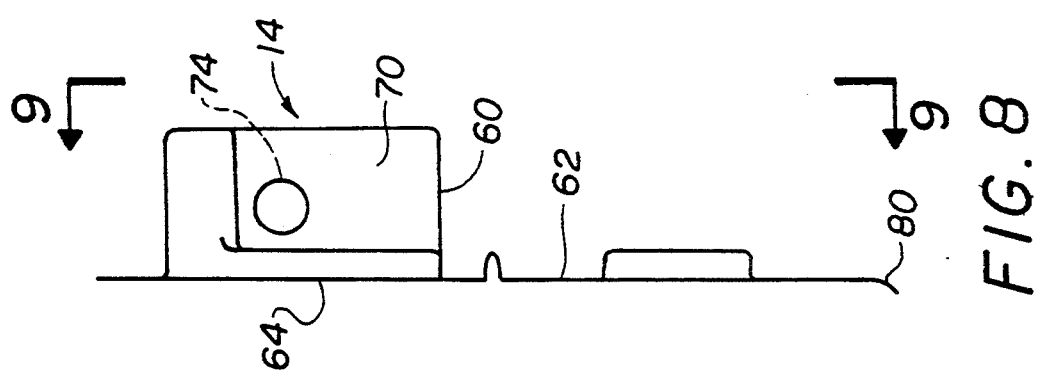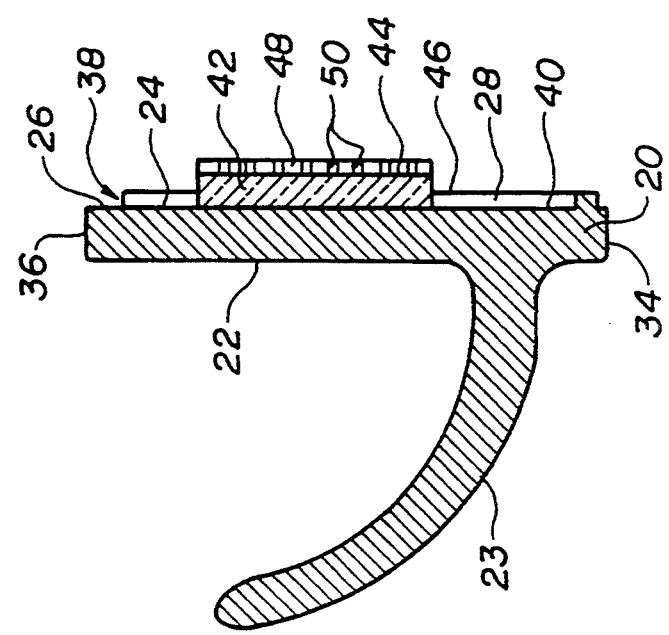

HOT MELT ADHESIVE HEATING BY MEANS OF MICROWAVE

This is a continuation of application Ser. No. 07/562,520 filed on Aug. 6, 1990, now abandoned.

TECHNICAL FIELD

The present invention relates to a structure and a technique for heating hot melt adhesive by means of microwaves, to place the hot melt adhesive in a tacky state in which it adheres to an object. A preferred structure according to the invention comprises an article of manufacture (e.g., a wall hook) having a mass of the hot melt adhesive and a susceptor thereon. The article, with the adhesive and susceptor thereon, can be subjected to microwaves for a predetermined period of time, to place the mass of adhesive in a tacky state which enables the article to be attached to an object (e.g., a wall). A special container for the article is placed with the article into a microwave oven as a unit, and removed as a unit from the oven. The container enables the article to be safely and efficiently attached to the object.

BACKGROUND

Hot melt adhesive has traditionally been applied to an article by means of a specially constructed applicator, known as a glue gun. The hot melt adhesive material is initially in a substantially solid state, and is shaped into the form of a stick. The stick is progressively heated, to melt the adhesive to a flowable, tacky state in which it can be applied to an article. The hot melt glue gun receives a stick of the adhesive material and directs the stick of adhesive progressively through a heating chamber, wherein the adhesive is melted into its tacky state. The melted adhesive is then forced from the glue gun and onto an article.

To the best of applicants' knowledge, hot melt glue guns have, for many years, used electrically heated elements to heat the adhesive in the heating chamber. Such hot melt glue guns require a source of electricity. For a number of years, hot melt glue guns derived the source of electricity by means of electric cords attached between the glue gun and a wall socket.

More recently, cordless hot melt glue guns have been growing in popularity. One known form of a cordless hot melt glue gun provides a special base which functions as a source of electricity, and from which the glue gun can be detached. The glue gun is electrically energized while on the base, to heat the adhesive to a tacky, flowable state. The glue gun is removed from the base and then carried to the place where the adhesive is to be applied to the article.

Hot melt glue guns have in at least one instance been used to attach wall hooks to walls. A disk holder for the wall hook is provided with an internal cavity and a central opening allowing access of a hot melt glue gun to the internal cavity. The disk holder is then placed against the wall with the internal cavity facing the wall, and adhesive is applied by disposing the nozzle of a hot melt glue gun into the hole to inject hot melt adhesive into the disk cavity. The technique requires three components, i.e., a disk, a wall hook, and the hot melt adhesive glue gun. Also, the technique involves sequentially attaching the disk holder and then the wall hook to the wall.

Another known way of hanging wall hooks on a wall comprises providing a disk holder for the hook which is separate from the hook, placing a mass of hot melt adhesive on the disk holder and then bringing the mass of adhesive into contact with a special electrically heated tool which melts the adhesive and allows the disk holder to be attached at a selected location on the wall. Thereafter the hook is attached to the disk holder. This technique still requires a special electrically energized heating element. Also, it involves three essential components, i.e., the heating element, the disk with the mass of adhesive, and the hook. Also, the technique leaves a hot mass of adhesive on the exterior of the disk holder, as the disk holder is being taken to a use location. This creates a risk of a user coming into contact with the heated mass of adhesive as the disk holder is being transported to the use location.

In all of the foregoing techniques a hot melt adhesive applicator or a special element for the disk holder, is introduced into the home solely for the purpose of applying adhesive or heating a mass of adhesive. Thus, threshold household decisions need to be made about acquiring the hot melt glue gun or the heating element and using it as an additional household appliance.

Also, electrically energized glue guns require a source of electricity for heating the hot melt adhesive in the glue gun. Moreover, electrically energized glue guns are relatively complex in construction and expensive to manufacture. Still further, electrically energized glue guns require storage, clean-up, and maintenance. It is believed that many consumers would be attracted to ways to simply and efficiently handle various home repair tasks, without tools such as glue guns.

SUMMARY OF THE PRESENT INVENTION

The present invention provides what is believed to be a new approach to the heating of hot melt adhesive. According to the present invention, techniques and structures are disclosed which allow hot melt adhesive to be heated in a microwave to place the hot melt adhesive in a tacky state in a condition to be adhered to an article.

According to a preferred concept of the invention, hot melt adhesive is initially attached, in a solid state, directly to an article such as a wall hook. The wall hook, with the adhesive thereon, is placed in a microwave oven. Heat is transferred to the hot melt adhesive to place the hot melt adhesive in a tacky state, ready to be applied to an object. The wall hook is then removed from the microwave oven, carried to the location on the wall to which it is to be attached, and then safely and efficiently attached to the wall. This concept avoids the need for a hot melt glue gun to apply the hot melt adhesive to the article. Rather, the article can be pre-formed with a mass of the hot melt adhesive thereon, heated in a microwave oven, and then attached directly to an object.

According to an additional aspect of the present invention, a special container is provided for the article. The container encloses the article while it is being heated, and remains closed around the article while the article is carried to the location at which it is to be used. This maintains heat around the article to keep the adhesive in a tacky state while the article is being transported. The container is shaped to provide a hand grip which enables the article to be handled as it is being attached to an object, without the user's hand coming in contact with the hot melt adhesive. Thus, the container is adapted to be safely and efficiently heated and then used to handle the article while the article is being applied to an object.

The preferred form of the invention provides an article with a mass of hot melt adhesive and a susceptor attached thereto. A susceptor is known in microwave cooking as a material which can be rapidly heated to relatively high temperatures when exposed to microwaves. The mass of adhesive is in heat transfer relationship with the susceptor so that when the article, the mass of adhesive and the susceptor are disposed as a unit in a microwave, the susceptor heats to high enough temperatures needed to melt the adhesive, and transfers the heat to the adhesive, to melt the adhesive to a tacky state. The susceptor is adapted so as to transfer heat to the mass of adhesive while avoiding transferring excessive heat to the article.

With the present invention, articles such as wall hooks or other articles which are intended to be attached to objects can be produced with the hot melt adhesive disposed thereon, and packaged in containers so as to be in a condition to be placed directly into a microwave oven. This is believed to be attractive from a manufacturing point of view. It is also believed to provide a simple and efficient way for people to adhesively attach articles to various objects, without the need to purchase or use an electrically energized, hot melt glue gun or other heating element.

An additional feature of the present invention is that with the growing popularity of microwave ovens as food heating equipment, the present invention takes advantage of an existing technology likely to be in most homes in the future. Thus, the microwave oven becomes the heating element, avoiding the need for purchasing, storing and maintaining hot melt glue guns or other forms of special heating equipment for hot melt adhesive.

The further features and advantages of the present invention will become further apparent from the following detailed description and the accompanying drawings.

DESCRIPTION OF THE DRAWINGS

FIG. 3 is a schematic side view of a prepackaged hook constructed according to the invention;

FIG. 4 is a view of the prepackaged hook of FIG. 3, taken from the direction 4—4;

FIG. 7 is an enlarged sectional view of the hook of FIG. 6, taken from the direction 7—7;

FIG. 8 is a side view of a container according to the invention, in an open condition;

FIG. 9 is a view of the container of FIG. 8, taken from the direction 9—9;

DETAILED DESCRIPTION OF THE PREFERRED EMBODIMENT

As discussed above, the present invention relates to the broad principle of heating hot melt adhesive in a microwave oven to place the hot melt adhesive in a tacky state in which it can be adhesively secured to an object. The principles of invention are disclosed below in connection with the heating of hot melt adhesive in a microwave for attaching an article such as a wall hook to a wall.

Figure 1:
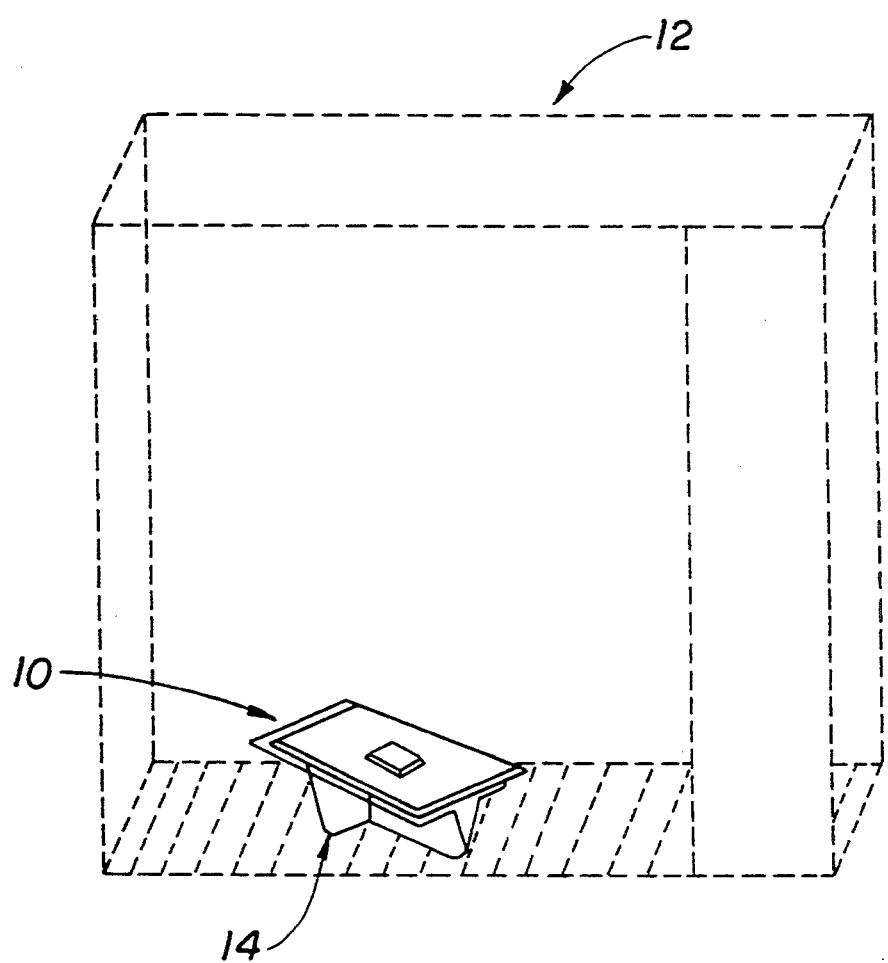
FIG. 1 is a schematic illustration of a prepackaged hook, constructed according to the principles of the present invention, disposed in a microwave oven.
Figure 2:
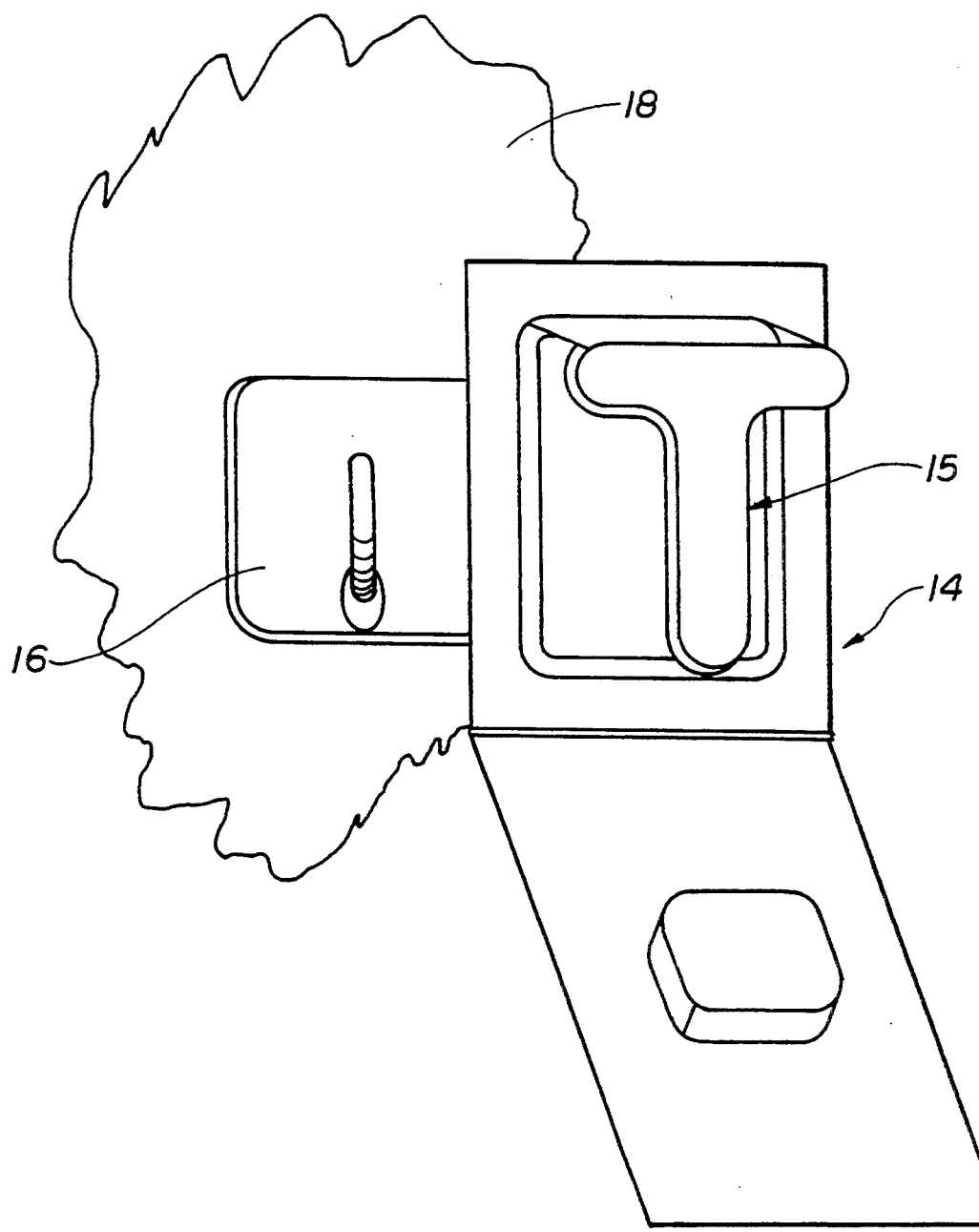
FIG. 2 is a schematic illustration of the manner in which the prepackaged hook, after heating, is used to attach the hook to a wall.
Figure 10:
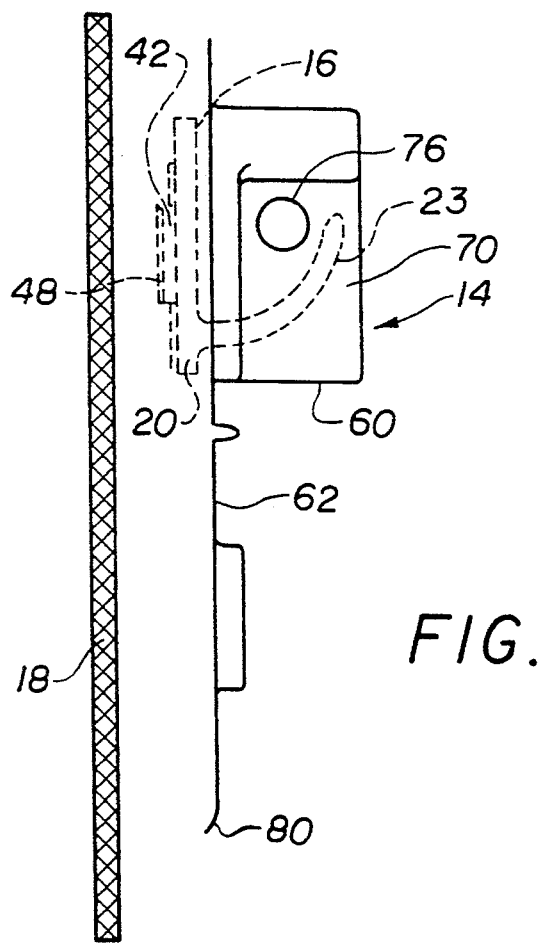
FIG. 10 is a schematic side illustration of the process of attaching a wall hook to a wall.
Figure 11:
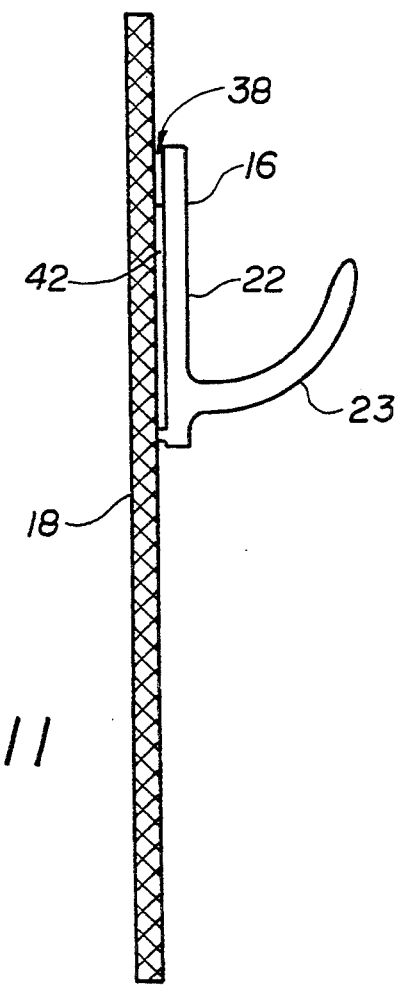
FIG. 11 is a schematic illustration of a wall hook according to the invention, attached to a wall.

FIG. 1 shows a packaged wall hook 10 disposed in a microwave oven 12. The packaged wall hook 10 comprises a container 14 with a wall hook disposed therein. The wall hook has hot melt adhesive connected therewith. In the microwave oven 12, the hot melt adhesive is heated from a substantially solid state to a tacky state. The packaged wall hook 10 is then removed from the microwave oven 12, and carried to the location at which the wall hook is to be applied to a wall. At the desired location, the container 14 is opened, and the wall hook 16 is applied to a wall 18 (see FIGS. 2, 10, 11), According to the preferred form of the invention, after the packaged wall hook 10 is heated in the microwave oven 12, the packaged wall hook 10 is carried to the location on the wall 18 to which the wall hook 16 is to be attached. As shown in FIGS. 3 and 4, the container 14 is closed while the packaged wall hook 10 is being transported, thereby providing a heat reservoir to maintain the hot melt adhesive in its tacky state while the packaged wall hook 10 is being transported. At the use location, the container 14 is opened, and a specially configured portion of the container 14 forms a hand grip 15. The hand grip 15 enables the wall hook 16 to be gripped by gripping the outside of the hand grip formed in the container 16. Thus, the wall hook 16 can be located properly against the wall 18 and held against the wall as the adhesive begins to cool, without a user ever touching the wall hook, or the adhesive thereon. This is believed to provide a significant safety feature because it minimizes the likelihood of hot melt adhesive contacting the user's skin.

Figure 5:
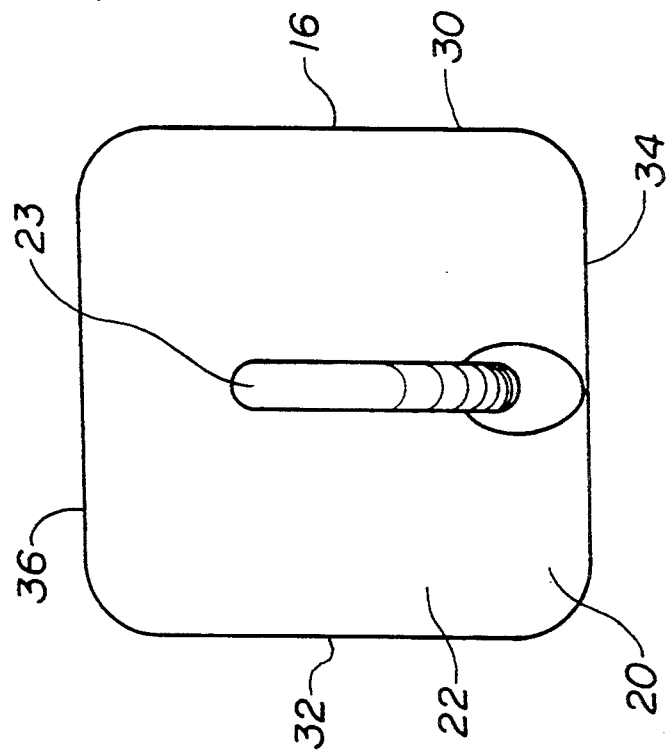
FIG. 5 is a front view of a hook constructed according to the invention.
Figure 6:
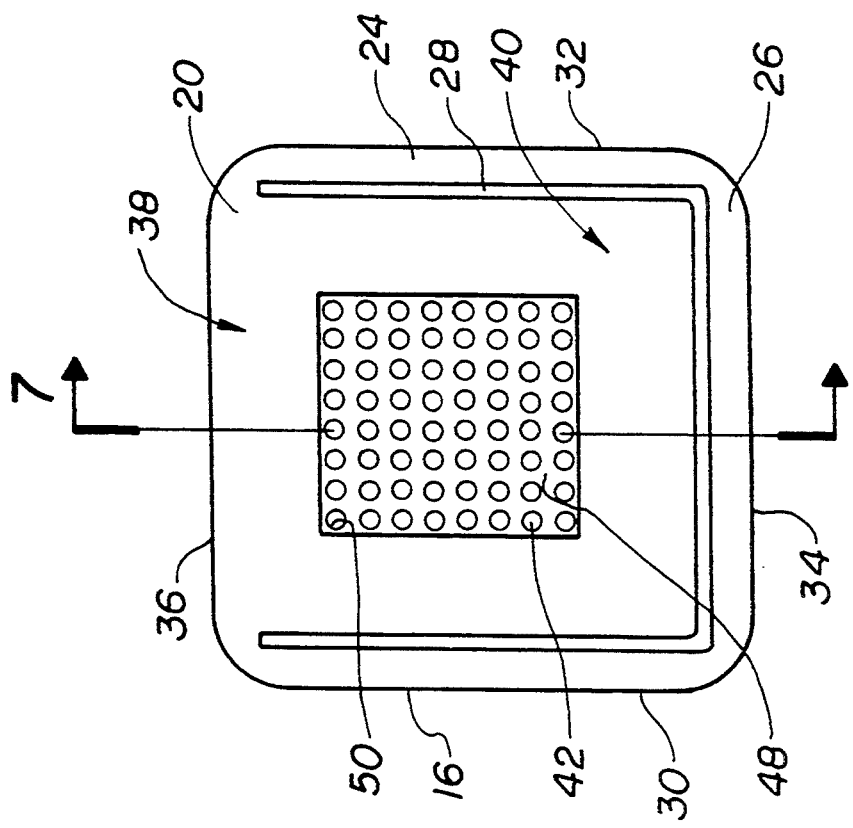
FIG. 6 is a rear view of the hook of FIG. 5.

Referring to FIGS. 5–7, the wall hook 16 comprises a base 20 having a front side 22 and a rear side 24. A hook shaped element 23 extends away from the front side 22 of the base 20. The base 20 and the hook shaped element 23 are preferably integrally molded of plastic. The rear side 24 of the base 20 comprises a surface 26 with a rim 28 extending away from a portion of the surface 26. The surface 26 is preferably rectangular, and the rim 28 extends along the two vertical sides 30, 32 and the bottom end 34 of the surface 26. The rim 26 does not extend along the top end 36 of the surface 26. This leaves an access opening 38 along the top end of the base 20 for reasons discussed hereinafter. The rim 28 and the surface 26 cooperate to define a trough 40 in the rear side 24 of the wall hook 16.

A mass of hot melt adhesive 42 is attached to the surface 26 on the rear side 24 of the wall hook 16. The mass of adhesive 42 is located in the trough 40. The mass of adhesive 42 is preferably rectangular in shape. The mass of adhesive is thick enough that its distal end 44 extends beyond the distal edge 46 of the rim 28 of the trough 40 (see FIG. 7). The mass of adhesive 42 may be attached to the surface 26 by any suitable means (e.g., by means of a spray adhesive, by forming an adhesive bond directly between the mass of adhesive and the surface 26, etc.)

A susceptor pad 48 is attached to the distal end 44 of the mass of hot melt adhesive 42. The susceptor pad 48 comprises a thin film of a polyester material with a deposit of metal particles thereon. The susceptor pad 48 can be made from a susceptor film sold commercially by National, Metalizing Company, Abell Road, Cranbury, N.J. The susceptor film has an optical density of 0.25. The susceptor pad 48 is attached to the mass of adhesive 42 so that the metal layer is disposed adjacent the mass of hot melt adhesive, and the polyester material is disposed on the outside of the hook 16. In the illustrated embodiment, the metal layer of the susceptor pad is in heat transfer relationship with the adhesive. Alternatively, the metal layer may be disposed within the mass of adhesive 42.

According to the preferred embodiment, the susceptor pad 48 includes a series of openings 50 extending therethrough. The openings 50 are regularly spaced in rows and columns (each having 8 openings) along the rear side of the hook 16, and each opening has a diameter of about 1/16 inches. The openings 50 allow the hot melt adhesive to be extruded therethrough as the hook 16 is being attached to a wall. The use of the susceptor pad 48 and openings 50 minimize the risk of direct contact with the mass of adhesive 42 and a user's skin.

The susceptor pad 48 can be attached to the mass of hot melt adhesive 42 by any suitable means (e.g. pressure bonding, adhesive bonding, etc.). The pattern of holes 50 in the susceptor pad 48, and the diameter of the individual holes 50 is designed so that when the adhesive 42 has been heated to a tacky state and the hook 16 is pressed against a wall, a sufficient amount of the adhesive will be extruded through the holes 50 to attach the hook 16 to the wall. On the other hand, the pattern and the size of the holes 50 is also designed so that little, if any, hot melt adhesive can inadvertently flow through the holes if the susceptor pad 48 is accidently touched while the adhesive is hot. This provides an additional safety factor, to further minimize the risk of a person's skin accidentally contacting the hot melt adhesive. Furthermore, after the hook 16 with hot melt adhesive 42 has been heated and is removed from the microwave oven, the susceptor acts as an insulating blanket and minimizes heat loss in the hot melt adhesive 42 until application to the wall surface.

The container 14 is specially configured to receive the hook 16. The container 14 comprises a receptacle 60 and a lid 62. The receptacle 60 has a shape designed to receive the hook 16 with the rear side 24 of the hook (i.e. the side carrying the adhesive) facing an opening 64 in the receptacle 60. The receptacle 60 is made of a flexible, thermoformed plastic which is substantially resistant to microwaves. Many suitable plastics, of the type normally used for forming clam-shell blister packages, are commercially available.

The receptacle 60 has wall portions 70, 72 disposed on opposite sides of the hook shaped element 23. The wall portions 70, 72 have indented finger recesses, 74, 76 enabling a user's fingers to be inserted therein on the opposite sides of the hook shaped element 23. This enables a user to firmly grip the hook 16 by pinching the wall portions toward each other so that the hook shaped element 23 is captured therebetween. Thus, the container 14 forms a hand grip for the hook. This feature is important during the application of the hook to a wall, as discussed hereinafter.

The lid 62 is preferably integrally formed with the receptacle 60. The lid 62 is adapted to hinge relative to the receptacle 60 so that the lid 62 can be brought into a covering relationship with the receptacle. The lid 62 is configured to maintain a clearance from the hot melt adhesive and susceptor pad on the rear side of the hook 16. A flap 80 on one portion of the lid enables the lid to be conveniently grasped and pivoted so as to uncover the receptacle 60.

The packaged hook 10 is disposed as a unit in the microwave oven 12. In the microwave oven 12 the packaged hook 10 is subjected to microwaves for a predetermined period of time. The container 14 is made of a flexible plastic that is substantially resistant to microwaves. The hook 16 is made of a relatively rigid plastic which is substantailly resistant to microwaves. The hook 16 can be made from an injection moldable plastic such as high density polystyrene or ABS. The hot melt adhesive 42 is preferably an adhesive manufactured and sold by The H. B. Fuller Company under the mark/designation Product Number 2125. The adhesive itself has a composition which would normally heat very slowly when subjected to microwaves. However, the susceptor material on the susceptor pad 48 is effectively heated by microwaves to a high enough temperature to melt the hot melt adhesive 42 to a tacky state. Susceptors are normally classified by optical density, and a susceptor for use in connection with this invention would have an optical density in the range of 0.15 to 0.35, which is a standard commercial range for susceptors. A preferred optical density is 0.25. The susceptor transfers heat to the hot melt adhesive 42 and continues to transfer the heat until the hot melt adhesive 42 is in a tacky state adapted to be attached to an object. Importantly, because the susceptor pad 48 is spaced from the body of the plastic hook, the susceptor material, which can get very hot during exposure to microwaves, is out of direct contact with the plastic hook 16 and thus does not burn the plastic hook. On the other hand, the heat resistant polyester portion of the susceptor pad 48 is on the outside of the mass of adhesive 42, and provides a measure of heat insulation in the event that someone accidentally touches the outside of the susceptor pad 48 after the hook has been heated in a microwave oven.

After the packaged hook 10 has been heated for a suitable period of time, it is removed from the microwave oven. With a susceptor having an optical density of 0.25 and the preferred hot melt adhesive material in a thickness range of about 0.125 inches, it is believed that suitable heating of the adhesive will take place in about a few minutes in a conventional microwave oven.

After the packaged hook 10 is heated, it is removed from the microwave oven 12. The packaged hook can be gripped by using the hand grip 15 to capture the hook shaped element 23. The finger recesses 74, 76 and the flexibility of the container 14 provide a very convenient, yet firm, hand grip to enable the hook 16 to be gripped while still in the container. Also, the lid 62 covers the receptacle 60 when the packaged hook 10 is removed from the microwave oven. Thus, as the packaged hook 10 is carried to a use location, the lid 62 remains closed, and maintains a body of heat within the container 14. This helps keep the adhesive tacky as the packaged hook 10 is being carried to a use location.

At the use location, the lid 62 is peeled back to open the receptacle 60. By using the hand grip 15 formed by the container, the hook 16 can be located and pressed against a wall without a user ever touching the hook 16.

As the hook 16 is pressed against the wall, the hot melt adhesive is forced (extruded) through the openings 50 to attach the hook to the wall 18. Also, hot melt adhesive 42 forced to the side of the susceptor pad 48 is captured within the trough 40. This helps spread the hot melt adhesive 42 but prevents the hot melt adhesive from flowing out the rear side 24 of the hook. The access opening 38 at the top of the hook enables a solvent or an implement to be directed and inserted into the trough 40 when it is desired to remove the hook 16 from a wall.

Thus, as seen from the foregoing discussion, the present invention provides a basic concept for heating adhesive within a microwave oven, and then attaching the adhesive to an object. The present invention is useful not only in heating the wall hook of the preferred embodiment, but also in heating any hot melt adhesive for virtually any purpose. For example, the principles of heating hot melt adhesive in a dispenser is disclosed in a concurrently filed United States patent application entitled, "Dispensing Apparatus and Method" filed by the same inventors herein and assigned to the assignee of this invention and application. Said concurrently filed application is set forth in Exhibit 1 hereto, and is incorporated herein by reference.

With the foregoing disclosure in mind, it is believed that additional aspects of this invention will become further apparent to those of ordinary skill in the art.

We claim:

1. A method of changing a hot melt adhesive in contact with an article from a relatively solid state to a tacky state in which it can adhere the article to an object, the method comprising the steps of:
   (a) providing a mass of the hot melt adhesive in a container which contains the article, the hot melt adhesive and a susceptor in a heat transfer relationship with the hot melt adhesive, said susceptor being adapted to be heated above a predetermined threshold temperature when subjected to microwaves for at least a predetermined period of time, said susceptor being adapted during the predetermined period of time to transfer sufficient heat to the mass of hot melt adhesive to cause the mass of hot melt adhesive to change to a tacky state in which it is capable of adhering the article to an object,
   (b) subjecting said mass of hot melt adhesive and said susceptor to a source of microwaves over said predetermined period of time to place the mass of adhesive in said tacky state,
   (c) removing said container containing the article and said mass of hot melt adhesive and the susceptor from said source of microwaves, and
   (d) locating at least a portion of said mass of hot melt adhesive on the article against a portion of an object to cause said mass of hot melt adhesive to adhere the article to an object.

2. A method for attaching an article of manufacture to an object, said article being substantially rigid and made from a material substantially resistant to microwaves, said article having a mass of hot melt adhesive attached thereto and a susceptor arranged in a heat transfer relationship with said hot melt adhesive, said mass of hot melt adhesive being in a relatively solid state in which it will not adhere to said object, said susceptor being selected so that when said article is subjected to microwaves in a household microwave food oven for a predetermined time said susceptor will transfer sufficient heat to said mass of hot melt adhesive to cause said mass to change to a tacky state in which it is capable of adhering to said object, said method comprising the steps of:
   (a) disposing said article, attached hot melt adhesive and susceptor in a container in a household microwave food oven,
   (b) subjecting said article, hot melt adhesive and susceptor to microwaves in said oven for said predetermined period of time so that said mass of hot melt adhesive is heated to a tacky state,
   (c) removing said article and attache hot melt adhesive from said microwave oven after said predetermined period of time while said hot melt adhesive is still in a tacky state, and
   (d) contacting at least a portion of said mass of hot melt adhesive while said adhesive is still in a tacky state with the object to adhere said article to said object.

3. The method of claim 2, wherein said susceptor has an optical density of 0.15 to 0.35.

4. The method of claim 3, wherein said susceptor is in contact with said hot melt adhesive.

5. The method of claim 3, wherein said susceptor is separate from, but in heat transfer relation with, said hot melt adhesive.

6. The method of claim 3, wherein said article and attached hot melt adhesive and susceptor are wholly enclosed within a container, said container being formed of a flexible plastic that is substantially resistant to microwaves,
   said method further comprising keeping said article and attached hot melt adhesive and susceptor wholly encased in said container during steps (a), (b) and (c) of said process.

7. The method of claim 6, wherein said cover is adapted to be removed from said receptacle to enable said article and hot melt adhesive to be removed from said container, said receptacle having a hand grip portion enabling said article to be gripped and held by gripping said hand grip portion of said receptacle while said article is disposed within said receptacle thereby enabling said article to be located against said object while said hot melt adhesive is in said tacky state, the flexible plastic forming said container being shaped to receive said article, said hand grip portion of said receptacle comprising portions of said flexible plastic disposed on opposite sides of a portion of said article, said portions of said flexible plastic adapted to be squeezed toward said portion of said article to enable said article to be gripped and held thereby,
   said method further comprising removing said cover from said receptacle after step (c) of said process, gripping the hand grip portion of said receptacle to thereby hold said article and, in step (d) pressing said mass of hot melt adhesive while still in a tacky state against said object while continuing to hold said article by gripping said hand grip portion of said receptacle.

8. The method of claim 7, wherein said article comprises a base, wherein said base is attached directly to one side of said mass of hot melt adhesive and wherein said susceptor is attached to another side of said mass of hot melt adhesive in a manner which spaces said susceptor from said base, whereby said base is protected from thermal damage from said susceptor when said susceptor is heated by said microwaves.

9. The method of claim 8, wherein said mass of hot melt adhesive has a proximal end attached to said base and a distal end spaced from said base, said susceptor comprising a susceptor pad covering said distal end of said mass of hot melt adhesive, said susceptor pad having openings of predetermined size, said openings adapted to enable portions of said mass of hot melt adhesive to be extruded therethrough when said mass of hot melt adhesive is in said tacky state, said openings being small enough to prevent hot melt adhesive in said tacky state from passing therethrough in response to pressure on said pad from accidental touching by a user.

10. A method for attaching an article of manufacture to a surface, said article being substantially rigid and made from a material substantially resistant to microwaves, said article having a mass of hot melt adhesive attached thereto and a susceptor arranged in heat transfer relationship with said hot melt adhesive, said mass of hot melt adhesive being in a relatively solid state in which it will not adhere to a surface, said susceptor being selected so that when said article is subjected to microwaves in a household microwave food oven for a period of time said susceptor will transfer sufficient heat to said mass of hot melt adhesive to cause said mass to change to a tacky state in which it is capable of adhering to a surface, said method comprising the steps of:
- disposing said article with said hot melt adhesive and susceptor attached thereto in a household microwave food oven,
- subjecting said article, hot melt adhesive and susceptor to microwaves in said oven for a period of time within which said mass of hot melt adhesive is heated to a tacky state,
- removing said article and attached hot melt adhesive from said microwave oven after said period of time while said hot melt adhesive is still in a tacky state, and
- contacting at least a portion of said mass of hot melt adhesive while said adhesive is still in a tacky state with a surface to adhere said article to said surface;
- wherein said susceptor has an optical density of 0.15 to 0.35;
- wherein said article and attached hot melt adhesive and susceptor are enclosed within a container having a cover, said container being formed of a flexible plastic that is substantially resistant to microwaves,
- said method further comprising the step of keeping said article and attached hot melt adhesive and susceptor encased in said container during steps (a), (b) and (c).

11. The method of claim 10, wherein said cover is adapted to be removed from said container to enable said article and hot melt adhesive to be removed from said container, said container having a hand grip portion enabling said article to be gripped and held by gripping said hand grip portion of said receptacle while said article is disposed within said container thereby enabling said article to be located against said object while said hot melt adhesive is in said tacky state, the flexible plastic forming said container being shaped to conform to said article,
- said method further comprising the steps of removing said cover from said container after step (c) of said process, gripping the hand grip portion of said container to thereby hold said article and, in step (d), pressing said mass of hot melt adhesive while still in a tacky state against said object while continuing to hold said article by gripping said hand grip portion.

12. The method of claim 11, wherein said article comprises a base, wherein said base is attached directly to one side of said mass of hot melt adhesive and wherein said susceptor is attached to another side of said mass of hot melt adhesive in a manner which spaces said susceptor from said base, whereby said base is protected from thermal damage from said susceptor when said susceptor is heated by said microwaves.

13. The method of claim 12, wherein said susceptor is comprised of a pad substantially covering said hot melt adhesive, said susceptor pad having openings of predetermined size, said openings adapted to enable portions of said mass of hot melt adhesive to be extruded therethrough when said mass of hot melt adhesive is in said tacky state, said openings being small enough to prevent hot melt adhesive in said tacky state from passing therethrough in response to pressure on said pad from accidental touching by a user.

14. In a process for attaching an article to an object in a home in which the article having a mass of hot melt adhesive attached thereto is pressed against said object so that said hot melt adhesive bonds said article to said object, said hot melt adhesive being at a temperature high enough so that said hot melt adhesive is in a tacky state when said article is pressed against said object, the improvement for heating said hot melt adhesive to a temperature at which said hot melt adhesive is in a tacky state comprising
- (a) placing a combination into a household microwave food cooking oven, said combination comprising
  - (i) said article,
  - (ii) said hot melt adhesive attached to said article, said hot melt adhesive being at a temperature below which said hot melt adhesive is in said tacky state, and
  - (iii) a susceptor arranged in heat transfer relation with said hot melt adhesive so that heat generated in said susceptor will heat said hot melt adhesive when said combination is subjected to microwaves, said susceptor having an optical density of 0.15 to 0.35,
- (b) preparing said combination for attachment to said object by subjecting said combination to microwave energy in said household microwave food cooking oven for a time sufficient so that said hot melt adhesive is heated to a tacky state,
- (c) removing said combination from said household microwave cooking oven while said hot melt adhesive is still in said tacky state,
- (d) transporting said combination to said object for attachment thereto while said hot melt adhesive remains in said tacky state, and
- (e) attaching said article to said object by means of said hot melt adhesive.

15. The process of claim 14, wherein said combination further includes a container wholly enclosing said article, said hot melt adhesive and said susceptor so that heat generated in said hot melt adhesive from said household microwave cooking oven will be retained in said hot melt adhesive when said combination is transported from said microwave oven to said object.

16. In a process for attaching an article to an object in a home in which the article has a hot melt adhesive attached thereto and is pressed against said object so that said hot melt adhesive bonds said article to said object, said hot melt adhesive being heated to a temperature at which said hot melt adhesive is in a tacky state when said article is pressed against said object, wherein said hot melt adhesive is heated to a temperature at which said hot melt adhesive is in a tacky state by the steps comprising, placing a combination into a household microwave food cooking oven, said combination comprising said article, said hot melt adhesive attached to said article, said hot melt adhesive being at a temperature below which said hot melt adhesive is in said tacky state, and a susceptor arranged in heat transfer relation with said hot melt adhesive so that heat generated in said susceptor will heat said hot melt adhesive when said combination is subjected to microwaves, said susceptor having an optical density of 0.15 to 0.35, preparing said combination for attachment to said object by subjecting said combination to microwave energy in said household microwave food cooking oven for a time sufficient so that said hot melt adhesive is heated to a tacky state, removing said combination from said household microwave cooking oven while said hot melt adhesive is still in said tacky state, transporting said combination to said object for attachment thereto while said hot melt adhesive remains in said tacky state, and attaching said article to said object by means of said hot melt adhesive;

wherein said combination further includes a container wholly enclosing said article, said hot melt adhesive and said susceptor so that heat generated in said hot melt adhesive from said household microwave cooking oven will be retained in said hot melt adhesive when said combination is transported from said microwave oven to said object.

17. The combination comprising (a) an article of manufacture adapted for attachment to an object, said article being substantially rigid and made from a material substantially resistant to microwaves, (b) a mass of hot melt adhesive attached to said article, said mass of hot melt adhesive being in a relatively solid state in which it will not adhere to said object, and (c) a susceptor arranged in heat transfer relation with said hot melt adhesive so that said susceptor will heat said mass of hot melt adhesive to a tacky state when said article is subjected to microwaves in a household microwave food oven for a predetermined time, whereby said article, hot melt adhesive and susceptor can be disposed in a household microwave food oven and subjected to microwaves over said predetermined period of time and thereafter said article and said hot melt adhesive removed from the microwave oven with said mass of hot melt adhesive being in a tacky state capable of adhering said article to said object.

18. The combination of claim 17, wherein said susceptor has an optical density of 0.15 to 0.35.

19. The combination of claim 18, wherein said susceptor is in contact with said hot melt adhesive.

20. The combination of claim 18, wherein said susceptor is separate from, but in heat transfer relation with, said hot melt adhesive.

21. The combination of claim 20, wherein said article comprises a base, wherein said base is attached directly to one side of said mass of hot melt adhesive and wherein said susceptor is attached to another side of said mass of hot melt adhesive in a manner which spaces said susceptor from said base, whereby said base is protected from thermal damage from said susceptor when said susceptor is heated by said microwave.

22. The combination of claim 21, wherein said mass of hot melt adhesive has a proximal end attached to said base and a distal end spaced from said base, said susceptor comprising a susceptor pad covering said distal end of said mass of hot melt adhesive, said susceptor pad having openings of predetermined size therein, said openings adapted to enable portions of said mass of hot melt adhesive to be extruded therethrough when said mass of hot melt adhesive is in said tacky state, said openings being small enough to prevent hot melt adhesive in said tacky state from passing therethrough in response to pressure on said pad from accidental touching by a user.

23. The combination of claim 22, wherein said base defines a trough partially surrounding said mass of hot melt adhesive so that hot melt adhesive flowing laterally relative to said pad is captured by said trough as said hot melt adhesive is being extruded through said openings in said susceptor pad.

24. The combination of claim 23, including means defining an access opening for said trough, said access opening providing access to said hot melt adhesive in said trough for removing said article from said object after said article has been adhered to said object.

25. The combination of claim 17, further including a container, said container comprising a receptacle and a cover for said receptacle, said container adapted to receive and wholly enclose said article, said mass of hot melt adhesive and said susceptor, said container being formed of a flexible plastic that is substantially resistant to microwaves.

26. The combination of claim 25, wherein said cover is adapted to be removed from said receptacle to enable said article and said hot melt adhesive to be removed from said container, said receptacle having a hand grip portion enabling said article to be gripped and held by gripping said hand grip portion of said receptacle while said article is disposed within said receptacle thereby enabling said article to be located against said object while said hot melt adhesive is in said tacky state, the flexible plastic forming said receptacle being shaped to receive said article, said hand grip portion of said receptacle comprising portions of said flexible plastic disposed on opposite sides of a portion of said article, said portions of said flexible plastic adapted to be squeezed toward said portion of said article to enable said article to be gripped and held thereby.

27. The combination of claim 26, wherein said article comprises a base, wherein said base is attached directly to one side of said mass of hot melt adhesive and wherein said susceptor is attached to another side of said mass of hot melt adhesive in a manner which spaces said susceptor from said base, whereby said base is protected from thermal damage from said susceptor when said susceptor is heated by said microwave.

28. The combination of claim 27, wherein said article comprises a wall hook.

29. The combination of claim 25, wherein said article comprises a wall hook.

30. An article of manufacture combined with an adhesive, a microwave susceptor, and a container, the combination comprising, an article of manufacture adapted for attachment to a surface, said article being substantially rigid and made from a material substantially resistant to microwaves, a hot melt adhesive attached to said article, said hot melt adhesive being in a relatively solid state in which it will not adhere to said object, and a susceptor arranged in heat transfer relation with said hot melt adhesive so that said susceptor will heat said mass of hot melt adhesive to a tacky state when said article is subjected to microwaves in a household microwave food oven for a predetermined time, whereby said article, hot melt adhesive and susceptor can be disposed in a household microwave food oven and subjected to microwaves over said predetermined period of time and thereafter said article and said hot melt adhesive removed from the microwave oven with said mass of hot melt adhesive being in a tacky state capable of adhering said article to a surface, and a container comprising a receptacle and a cover for said receptacle, said container adapted to receive said article, said hot melt adhesive and said susceptor, said container being formed of a flexible plastic that is substantially resistant to microwaves; wherein said cover is openable to expose said article within said receptacle to enable said article and said hot melt adhesive to be removed from said container, said receptacle having a hand grip portion enabling said article to be gripped within said container and held by gripping said hand grip portion of said receptacle while said article is disposed within said receptacle thereby enabling said article to be located against said object while said hot melt adhesive is in said tacky state, the flexible plastic forming said receptacle being shaped to receive said article, said hand grip portion of said receptacle comprising portions of said flexible plastic disposed on opposite sides of a portion of said article, said portions of said flexible plastic adapted to be squeezed toward said portion of said article to enable said article to be gripped within said container.

31. The combination of claim 30, wherein said article comprises a base, wherein said hot melt adhesive is applied to one side of said base, and wherein said susceptor is attached to another side of said hot melt adhesive so that said mass of hot melt adhesive separates said susceptor from said base.

32. The combination of claim 30, wherein said article comprises a wall hook having a base portion to which said adhesive is applied.

33. An article of manufacture adhesively attachable to a surface, and a container for said article comprising, in combination, an article of manufacture having a portion for receiving an adhesive material, an adhesive material applied to a portion of the article of manufacture, the adhesive material capable of being heated to a tacky state in which the adhesive material will adhere the article of manufacture to a surface, a microwave energy susceptor in contact with the adhesive material applied to a portion of the article, and a container surrounding at least a portion of the article of manufacture, the container having a covered opening which when opened exposes the portion of the article of manufacture to which the adhesive material is applied.

34. The combination of claim 33 wherein the article comprises a hook having a mounting plate, the adhesive material is applied to the mounting plate, and the susceptor is applied to adhesive material.

35. The combination of claim 34 wherein the container has a configuration which conforms to the hook and which has a gripping portion whereby the hook can be manipulated within the container by handling the gripping portion of the container.

36. The combination of claim 34 wherein the opening to the container is positioned proximate the mounting plate of the hook.

37. The combination of claim 33 wherein the susceptor is separated from the article by the adhesive material.

38. The combination of claim 33 wherein the container is comprised of a plastic blister package which encloses the article and the adhesive material and the susceptor, and further comprises a frangible hinge connecting an openable cover to the opening of the container.

39. The container of claim 38 comprised of a microwave resistant plastic.

40. The susceptor of claim 33 in the form of a perforated sheet applied to a surface of the adhesive material away from the article, wherein perforations in the sheet are of size sufficient to allow the adhesive material to be extruded through the perforations.

* * * * *